United States Patent [19]

Edwards

[11] Patent Number: 4,754,271

[45] Date of Patent: Jun. 28, 1988

[54] LIQUID CRYSTAL PHOTOGRAPH

[76] Inventor: Willie Edwards, 312 Kingston Dr., King, N.C. 27021

[21] Appl. No.: 24,122

[22] Filed: Mar. 10, 1987

[51] Int. Cl.[4] ............................................. H04N 3/14
[52] U.S. Cl. .................................. 340/784; 358/909; 364/410
[58] Field of Search ........................ 358/909; 364/410; 340/765, 784

[56] References Cited

U.S. PATENT DOCUMENTS

| 4,165,072 | 8/1979 | Stubben | 364/410 |
| 4,456,931 | 6/1984 | Toyoda et al. | 358/909 |
| 4,489,351 | 12/1984 | D'Arc | 358/909 |
| 4,591,917 | 5/1986 | Suzuki | 358/909 |
| 4,647,976 | 3/1987 | Nakagaki et al. | 358/909 |
| 4,672,541 | 6/1987 | Bromley et al. | 364/411 D |

FOREIGN PATENT DOCUMENTS 183582 10/1984 Japan .................................. 358/909

*Primary Examiner*—Howard A. Birmiel

[57] ABSTRACT

A device for electronically generating a plurality of single still pictures which are stored in the device's self-contained programmed digital memory cartridge and which is displayed on a liquid crystal screen. The device is a structure resembling a thin pocket calculator.

3 Claims, 4 Drawing Sheets

LIQUID CRYSTAL PHOTOGRAPH

BACKGROUND OF THE INVENTION

There are various methods of producing pictures. The automatic developing instant type pictures, regular snapshots, portraits, etc. Pictures are now even able to be reproduced upon articles of clothing with the help of computers.

Picture reproduction of late via videocassette recorders has become commonplace. Some of the advantages of a videocassette recorder (VCR) are slow motion and freeze-frame viewing. The additional utilization of a camcorder makes the viewing all the more selective and convenient. There are both portable and table model videocassette recorders as well as minicamcorders. However, the size of these units can still present a rather imposing presence in a semi-private setting such as an office or work position. The advent of the electronic microchip has made pocket-sized television sets of the type described by inventors Y. Hirasawa and O. Kameda of U.S. Pat. No. 4,562,478 increasingly popular. And although some of the even smaller sets with their 1.3 inch liquid crystal display (LCD) screens allow them to be carried about in the shirtpocket, still, a television broadcast is not as personalized or sentimentally inspiring as a photograph.

Given the human fascination for a technologically produced picture and the paramount event-preserving tradition of the photograph, the invention herein described integrates the two facets.

In its initial appearance the invention described herein—which is an LCD photograph—looks very much like a thin LCD shirt-pocket calculator, some of which operate entirely off of solar cells and have a thickness of only 1/16 of an inch.

There are microprocessor-based toys available which have LCD screens upon which rough sketches may be structured by the user and up to a dozen displays stored in memory. These same displays have animated abilities with speed control. However, a brief comparison between this device and the invention described herein will readily reveal many fundamental differences.

SUMMARY OF THE INVENTION

It is the object of this invention to provide an electronic photograph with selectable animated properties.

The use of liquid crystal displays is becoming increasingly widespread. Two facets of the technology are dealt with in U.S. Pat. No. 4,560,982, the inventors being T. Sonehara, M. Murata and T. Ota and U.S. Pat. No. 4,591,849 the inventors being A. J. Hughes. F. C. Saunders and I. A. Shanks.

The technology of liquid crystal displays has advanced to the point where the displays are not only quite clear, but are also able to produce color pictures.

The picture itself of this invention is shown on a liquid crystal display (LCD) and the picture information originates from a plug-in read-only memory (ROM).

While analog signals are still commonplace, in many situations digitizing a signal makes it more advantageous to store, retrieve and process the same signal.

The photograph's ROM data is derived from the freeze-frame format of a vidiocassette recorder, but, in fact, could have been taken from any digitized signal.

The photographic ROM can be programmed with a plurality of frames. In its most common presentation, when the ROM—which has sliding contact terminals—is inserted into the display unit, the two sections form a single plastic card approximately the thickness of a thin calculator and is capable of fitting into a shirt pocket.

The electronic photograph is powered by both a battery and a group of solar cells.

The electronic photograph can be displayed in color or in large sizes.

In the animated format, when several near-similar frames have been taken and stored in the ROM, the repetitive picture can display a child taking his first step, a friend's flashing smile or waving hand or capture a vacation scene of waves rushing onto a beach. In the latter portrayal—when a color picture having animated ocean waves is large enough to be hung on a wall—the backlighted image is more conveniently powered from a wall receptacle. Even more rewarding, however, is the situation in which there are several members of a family and one single picture sitting on an office desk which automatically portrays a different family member's picture every five minutes.

BRIEF DESCRPITION OF THE DRAWINGS

Figure 4:
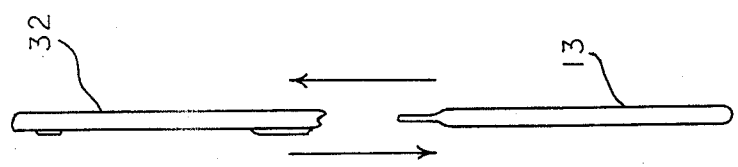
Figure 3:
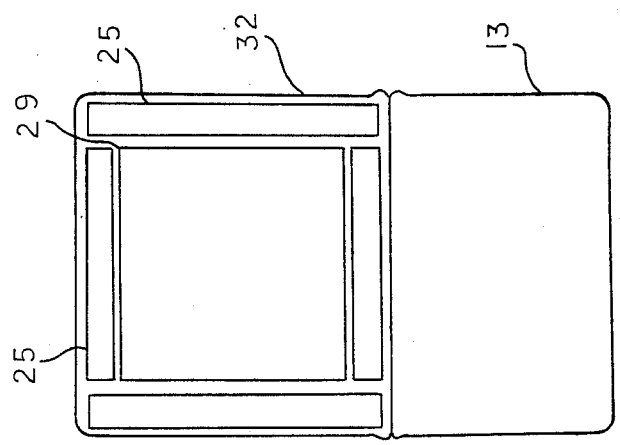
Figure 5:
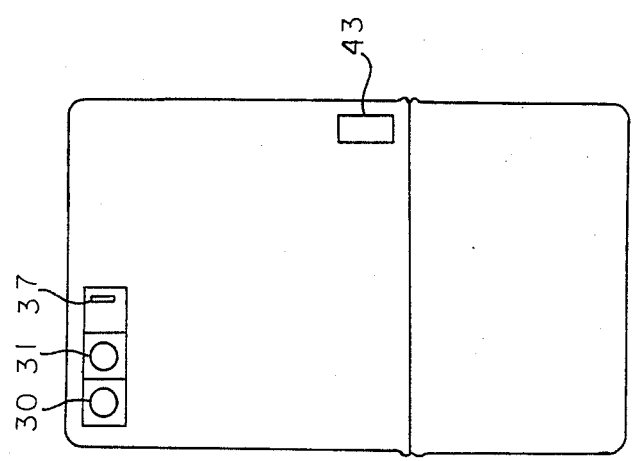

FIGS. 3, 4, and 5 are multiple views of the electronic photograph showing the outside physical details.

Figure 6:
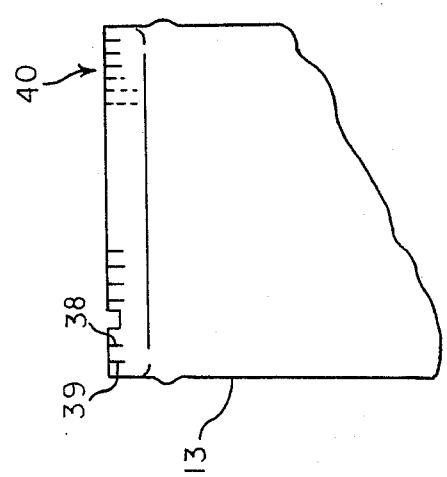

FIG. 6 is a partial-view of the ROM storage cartridge with emphasis on the terminal contact arrangement.

DESCRIPTION OF THE PREFERRED EMBODIMENTS

This invention relates to a liquid crystal display device. The display is derived from a storage section 13 which is shown in FIG. 3.

The picture itself which is to be displayed on the liquid crystal display (LCD) originates from a digitally encoded picture frame. This frame was taken earlier by a camcorder (not shown). The information is captured on a videocassette by the camcorder and the videocassette is inserted into the digital videocassette recorder (VCR) 1 of FIG. 1. Digital VCRs have the ability to convert analog video signals into digital format. This digital data is stored in a random access memory (RAM) within the VCR 1 and is used for certain VCR effects known commonly by VCR uses. One of these effects is known as freeze-frame.

Figure 1:
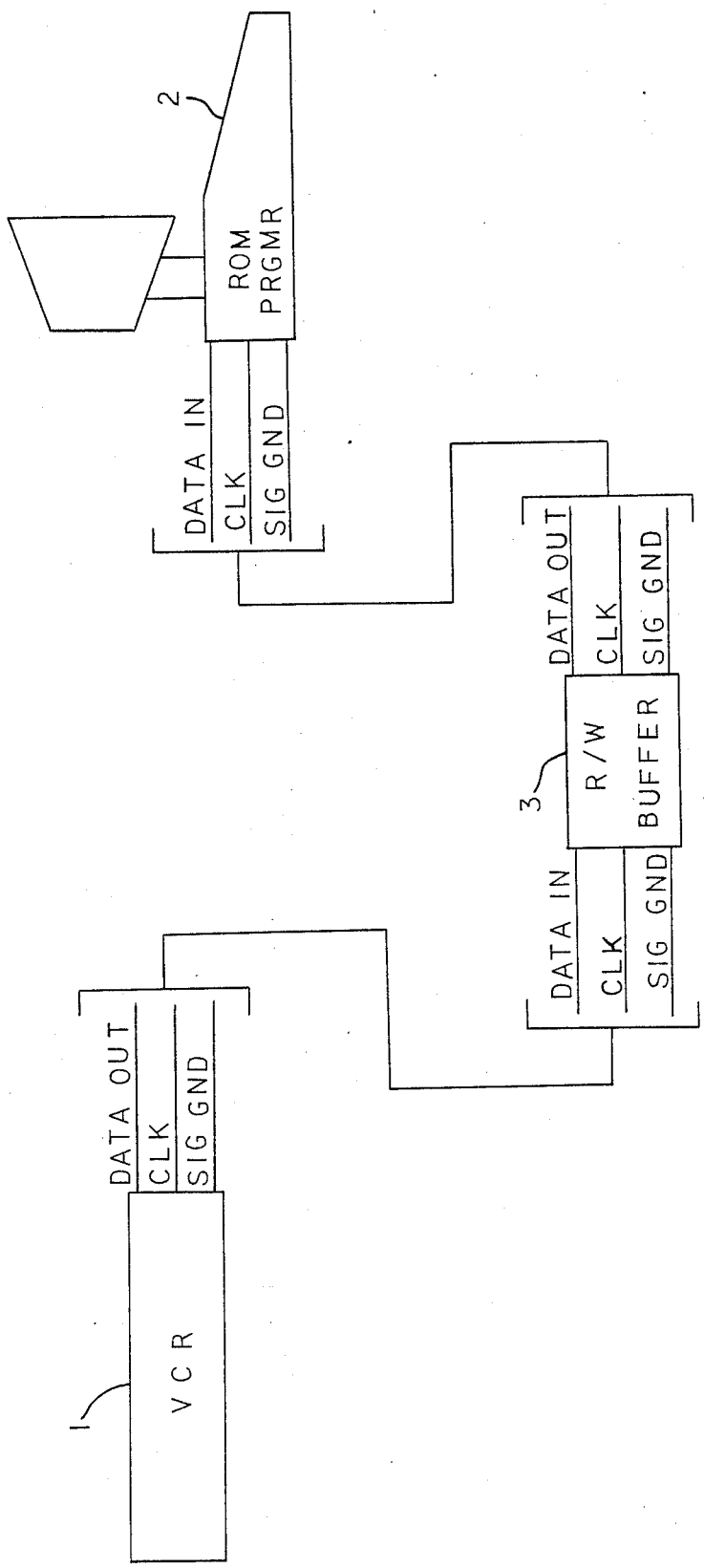
FIG. 1 is a diagram showing the capture and storage of digitized picture data for a liquid crystal display memory cartridge according to the present invention.

When the desired frame is selected and the digital clock signal and data signal are picked off at the VCR, they are stored within the properly grounded independent read-write buffer 3 of FIG. 1.

Independent read-write buffer 3 is a first-in-first-out memory. From the memory buffer 3, the data is strobed into the read-only memory (ROM) programming system 2.

After a picture frame in its digital format is stored in the ROM programmer 2, it is formatted in accordance with the LCD row-column matrix upon which it will ultimately be displayed. Each ROM is memory mapped. That is, in a typical situation where there are six picture frames programmed into the ROM, each frame is allocated a specific or predetermined number of address locations. In identically sized ROMs these address locations will always be the same for a given frame. For instance, frame two—or any other frame, for that matter—will always begin and end at the same addresses on a comparable ROM picture cartridge.

When a ROM cartridge 13 has been programmed with one or more frames and the cartridge is inserted into the display section 32, as shown in FIG. 3, the photograph is complete. A battery is inserted through access 43 of FIG. 5. When on-off control switch 37 is set to the on position, it can be seen in FIG. 2 that two sources of power are immediately applied to the photograph. Thru this same switch 37 (A and B), contact A supplies power from battery 52 thru the ROM cartridge 13 contact 38 to power circuitry 51. Thru switch 37 contact B, power is applied from a battery of solar cells 25, again thru ROM cartridge 13—this time thru contact 39—to power circuitry 51. Looking at ROM cartridge 13 in FIG. 6, the power lockout contacts 38 and 39 are merely hard-wired, feed-thru loops resurfacing on opposite sides of the ROM cartridge terminal strips. The battery of solar cells are arranged in series-parallel. The effect is that fundamentally the power for the photograph is produced by abmbient light. As in a conventional photograph, when abmbient there is no light, then the photograph cannot be realized. In the invention, when the photograph is in the dark, then the display is automatically turned off. This is true even though switch 37 is on. There is a set on-off level determined by comparator 33 of power circuitry 51. Battery 52, of FIG. 2 by itself does not cause the display to be powered-up. When sufficient ambient light is supplied, such as turning on the office lights so that work can be performed, then the solar cells exceed the threshold voltage needed to switch on the power. Battery 52—while part of the sensing circuit—serves merely to augment the power. Voltage regulator 34 senses and maintains the correct level of power output to the system. The power circuitry 51 also supplies the voltage required by the signal controller 35. The signal controller 35, in association with the main control logic 27, serves to supply the scan logic and LCD drivers 36 for the display rows with the voltage levels required in a typical liquid crystal display. The operation of the LCD scan drivers 36 is managed by the main control logic 27. The column driver circuitry comprising signal logic and LCD drivers 28 controls the levels of voltages required in the conventional operation of the drive levels of liquid crystal displays. Inclusive is the remedial a.c. signal which serves to prevent LCD degradation. This, as was the the operation of the row drivers 36, is also done under the control of the main control logic 27.

The outputs of LCD drivers 36 and 28 are fed into liquid crystal display 29. The liquid crystal display 29 is a matrix of m scanning electrodes 42 and n signal electrodes 41. Pixels or picture elements are formed at each intersection, with the total picture elements equaling m×n. The coordination of the LCD driver voltages applied to the scan and signal electrodes by their respective drivers 36 and 28, in conjunction with the data signal from ROM 13 via the signal logic 28 determines a pixel's viewing state.

Figure 2:
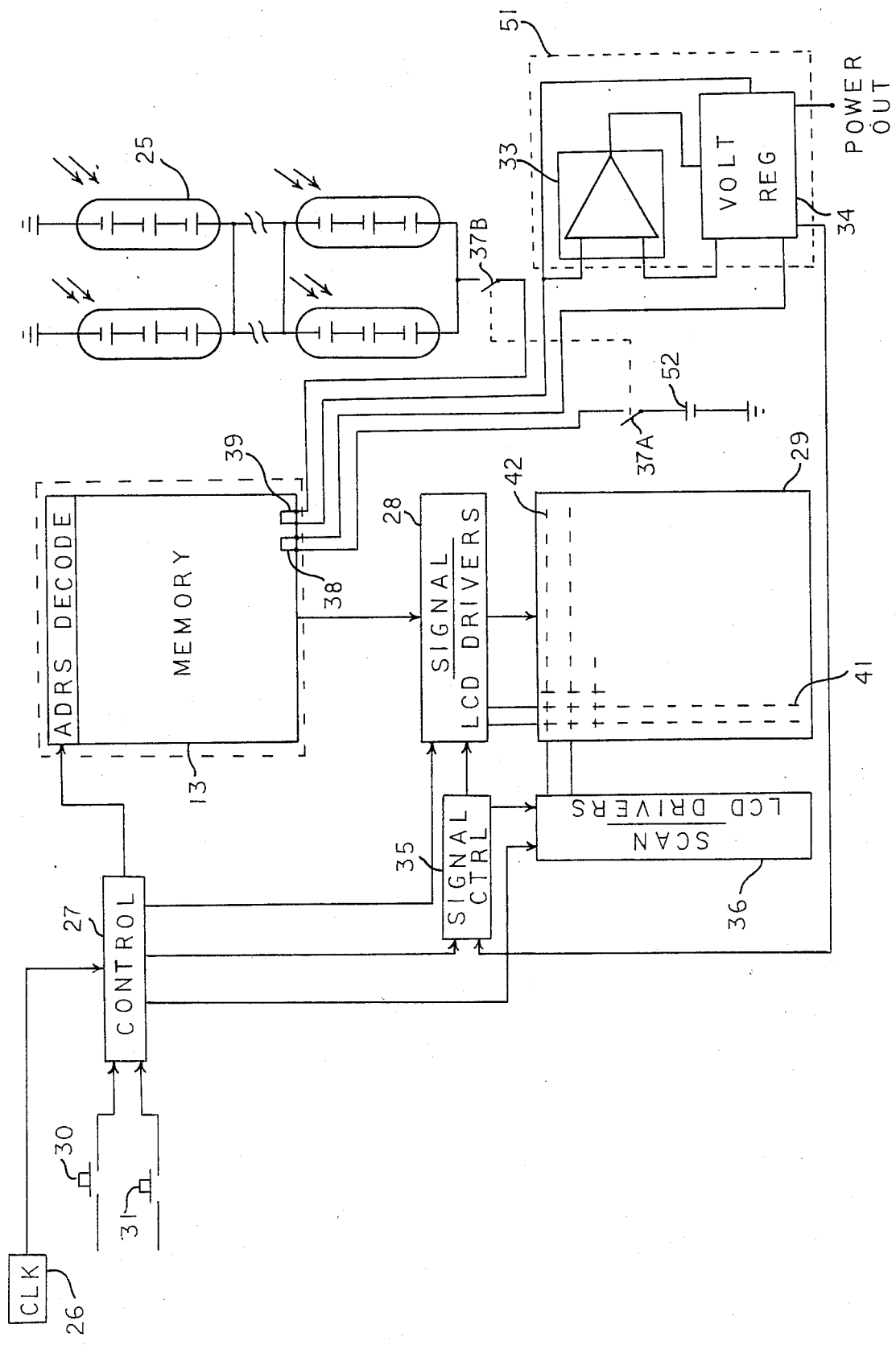
FIG. 2 is a block diagram of the electronic circuitry of the liquid crystal display photograph.

Picture data signals from ROM 13 are sent to the signal logic 28 via the memory data output terminals 40 of FIG. 6. The LCD is refreshed with this picture data constantly until the viewer depresses membranous pushbutton 30, which is shown in FIG. 2 and located on the back of the photograph as also shown in FIG. 5. This action causes the main controller logic 27 to advance the address selection, which is decoded by the address decoding logic of the ROM 13. Each successive operation of pushbutton 30 addresses another page or frame of memory 13. If pushbutton 31 is depressed, the main control logic causes the memory address to go into a delayed sequence in which one frame is fetched, held for display for a period of typically five minutes, then the frames immediately following are automatically fetched in their sequence. This endless loop continues until pushbutton 30 resets the counting sequence, locking in a single frame again. However, if, while already in auto-sequencing which is the frame-delay mode, the same pushbutton 31 is pushed again, the sequencing is increased by shortening the hold-time of a picture frame. Display hold-times of typically five minutes, 5 seconds and 0.5 seconds are selectable. This frame sequence timing, as well as all timing, is a function of the system clock 26.

It can be said that digital data that is stored in a ROM can also be stored in RAM, including sound effects for animated ocean waves, birds, etc. which the larger wall-hung displays could easily accomodate-having more room for memory.

I claim:

1. A liquid crystal photograph comprising:
a thin two-piece interconnecting plastic casing having a thickness of approximately one-sixteenth of an inch and is small enough to fit into a shirtpocket;
liquid crystal display means situated upon a first section of said two-piece interconnecting plastic casing for viewing a data-sourced photographic image;
microelectronic circuitry operating means situated within said two-piece interconnecting plastic casing for responding to a plurality of viewer selected input display functions;
externally programmable storage means comprising a second section of said two-piece interconnecting plastic casing for storing within a readable memory data representing a plurality of still picture frames to be viewed on said display means;
control means for controlling reading of said still picture frames from said storage means and for determining the visual duration of said picture frames presented on said liquid crystal display means, including sequencing means responsive to said viewer inputs for providing a plurality of imaging formats ranging from a still picture freeze-frame to a time-delayed auto-sequence to an animated image;
connection means situated upon both pieces of said two-piece interconnecting casing for allowing said storage means comprising said second section to be inserted into said first section whereupon said display section is situated; and
extended energizing means wherein a plurality of solar cells are connected so as to provide a permanence of power to said display to the extent that a viewer may continuously realize said display due essentially to the presence of ambient visible light.

2. A picture display card comprising:
a liquid crystal display means situated upon a bisectional shirtpocket-sized card and having a thickness of approximately one-sixteenth of an inch;
light energy power means for providing sufficient power to said picture display card to effect a picture display on said card as long as visible light is present;

an externally programmable digital data storage means for storing data signals representing a plurality of selectable picture frames within an interchangeable cartridge, said cartridge forming a section of said bisectional card;

microelectronic circuitry means for responding to a plurality of input signals for coordinating selection by a viewer of said picture frames and presentation of said picture frame data to said liquid crystal display means;

connection means on said bisectional card for permitting one section to physically and electrically accommodate the other section in order for said stored picture frame data to be made accessible to said display means; and automatic sequencing means for enabling a viewer to enact a display mode in which a plurality of said stored picture frames are automatically displayed in periodic succession.

3. A card-thin image portrayal system comprising:

a thin bisectional encasement having a thickness of approximately one-sixteenth of an inch;

digitized picture-frame storage means within one section of said bisectional encasement for storing preprogrammed image signals;

connection means for providing signal continuity between two sections of said bisectional encasement;

liquid crystal display means incorporated within said bisectional encasement for portraying an image;

viewer control means for inputting a plurality of signals by said viewer to effect a plurality of viewing formats of said displays;

microelectronic system control means within said encasement for providing operational display functions of said image portrayal system;

animation means for enabling said image portrayal system to produce a continuous and repetitive live-action display; and light-based power means for establishing the presentation of said image and maintaining the duration of said image essentially on the basis of the presence of ambient visible light.

* * * * *